(12) United States Patent
Launay et al.

(10) Patent No.: US 6,766,048 B1
(45) Date of Patent: Jul. 20, 2004

(54) METHOD OF MULTIRESOLUTION RECONSTRUCTION OF A THREE-DIMENSIONAL IMAGE OF AN OBJECT

(75) Inventors: Laurent Launay, St Remy les Chevreuse (FR); Yves Trousset, Palaiseau (FR); Régis Vaillant, Villebon sur Yvette (FR)

(73) Assignee: GE Medical Systems SA, Buc (FR)

( * ) Notice: Subject to any disclaimer, the term of this patent is extended or adjusted under 35 U.S.C. 154(b) by 651 days.

(21) Appl. No.: 09/694,229

(22) Filed: Oct. 23, 2000

(30) Foreign Application Priority Data

Oct. 26, 1999  (FR) ............................................ 99 13328

(51) Int. Cl.[7] ................................................ G06K 9/00
(52) U.S. Cl. ...................................... 382/154; 382/128
(58) Field of Search ................................ 382/154, 128, 382/130, 131, 132; 345/418, 419, 424; 356/12; 378/9

(56) References Cited

U.S. PATENT DOCUMENTS

| | | | |
|---|---|---|---|
| 5,123,056 A | 6/1992 | Wilson | 382/6 |
| 5,375,156 A | * 12/1994 | Kuo-Petravic et al. | 378/9 |
| 5,568,384 A | 10/1996 | Robb et al. | 364/419.13 |
| 5,782,762 A | 7/1998 | Vining | 600/407 |

* cited by examiner

*Primary Examiner*—Vikkram Bali
(74) *Attorney, Agent, or Firm*—Jay L. Chaskin; Cantor Colburn LLP

(57) ABSTRACT

The invention concerns a method of three-dimensional image reconstruction from a set of acquired two-dimensional images. A subsampling is taken of the set of acquired two-dimensional images so as to reduce their resolution. A first analytical algorithm of three-dimensional image reconstruction from low-resolution (LR) acquired two-dimensional images is applied in order to obtain a low-resolution three-dimensional image. A reconstruction support is determined by selecting in the low-resolution three-dimensional image a set of particular voxels. One then applies a second analytical algorithm of three-dimensional image reconstruction from acquired two-dimensional images and considering only the voxels of the reconstruction support in order to obtain the high-resolution (HR) three-dimensional image.

9 Claims, 3 Drawing Sheets

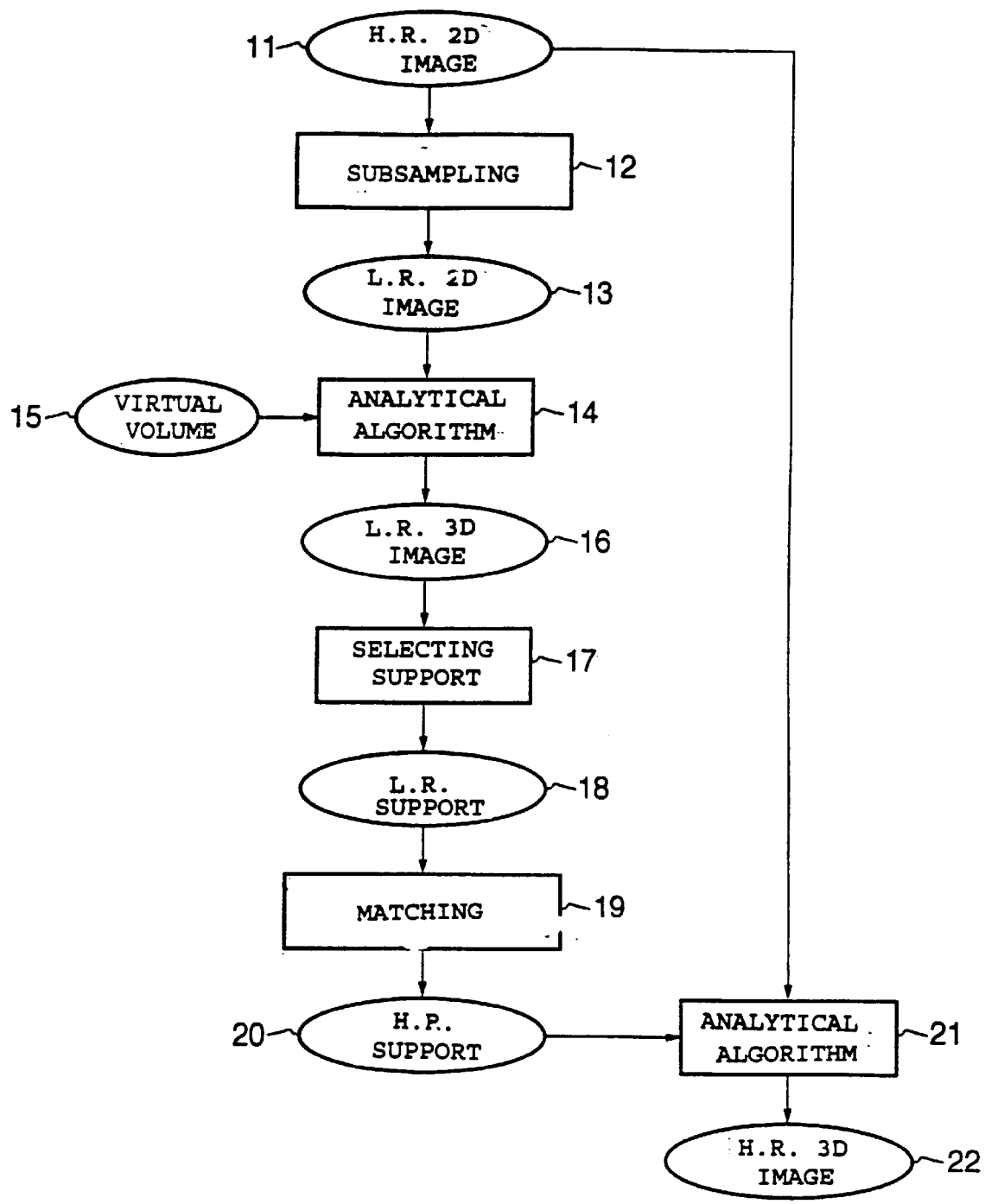

METHOD OF MULTIRESOLUTION RECONSTRUCTION OF A THREE-DIMENSIONAL IMAGE OF AN OBJECT

BACKGROUND OF THE INVENTION

The invention concerns the multiresolution reconstruction of a three-dimensional image of an object particularly from a set of two-dimensional projected images of the object obtained for different positions of a camera around the object.

It has a particularly important application in the medical field, in which reconstruction of the internal structures of the patient under examination is undertaken, particularly the reconstruction of angiography images, that is, obtaining images of vasculature opacified by injection of a contrast medium.

The invention can, nevertheless, have applications in other fields, notably, in nondestructive industrial control, in which examinations of the same type as medical examinations are performed.

In the medical field the two-dimensional projected images of the object, a patient's head, for example, are generally obtained by rotation of an X-ray camera turning around the object.

There are essentially two types of reconstruction algorithms in X-ray imaging.

A first type concerns the so-called algebraic iterative methods of reconstruction.

A second type, with which the invention is concerned, provides for a calculation of filtering and back projection called analytical method. The analytical method uses a mathematical model of the system of acquisition of acquired two-dimensional images. Each pixel of an acquired two-dimensional image contains a gray level which represents the resultant of the intensity of an X-ray having crossed a group of tissues. That statement is then expressed in the form of an analytical equation from which an inverse equation is determined, making it possible to determine a volume representation from gray levels of pixels of two-dimensional images.

The analytical reconstruction of a three-dimensional image essentially uses two stages, a first filtering stage and a second back projection stage. Both stages result from the inverse equation. From a virtual volume, a cube, for example, divided into elementary volume elements called voxels, back projection makes it possible to take each voxel, project the voxel on the acquired two-dimensional images and find the sum of the gray levels of the pixels obtained by projection. The gray level assigned to the voxel is the sum of the gray levels of the pixels obtained by projection.

In general, the methods of reconstruction of analytical type employ an analytical algorithm that is directly applied on the acquired two-dimensional images.

The acquired two-dimensional images generally have a resolution equal to 512, that is, they contain 512 lines and 512 columns of pixels. To take best advantage of the total images acquired in 512 resolution, the image reconstruction algorithm can be applied with a resolution of 512, a treatment would thus be obtained on approximately 134 million ($512^3$) voxels, which is much too great a number, necessitating a long calculation time and, in any case, not very useful, for the vascular structures that it is generally desired to visualize typically occupy approximately 2% to 5% of the virtual volume.

Methods of reconstruction of algebraic type are known, notably, that described in French patent No. 89 16906, which propose applying an iterative algorithm not directly on the acquired two-dimensional images, but on those images after modification. Modification consists of taking an average on each acquired two-dimensional image endowed with a given resolution, called high resolution (HR), so as to obtain an acquired two-dimensional image of lesser resolution called low resolution (LR). The algebraic algorithm is applied on that low-resolution two-dimensional image to form a low-resolution three-dimensional image with a very short calculation time. Then the low-resolution image is transformed into a high-resolution three-dimensional image (identical to the resolution of the initial acquired two-dimensional images) by using complex methods of trilinear interpolation. The algebraic algorithm is then applied by using the three-dimensional image of greater resolution and the initial acquired two-dimensional images (unmodified). That method of reconstruction applies only to algebraic algorithms.

BRIEF DESCRIPTION OF THE INVENTION

The present invention is to apply the multiresolution technique to analytical type algorithms.

The invention is also intended to reduce the time of calculation of three-dimensional image reconstruction by using an analytical type algorithm.

The invention therefore proposes a method of three-dimensional image reconstruction from a set of two-dimensional images acquired by means of a camera. In order to do so, a subsampling is taken of the set of acquired two-dimensional images so as to reduce the resolution of the acquired two-dimensional images. That stage can be matched to a smoothing stage for which the final image obtained contains a number of pixels less than the initial acquired two-dimensional image.

A first analytical algorithm of three-dimensional image reconstruction from low-resolution (LR) acquired two-dimensional images is then applied in order to obtain a low-resolution three-dimensional image.

A reconstruction support is determined by selecting in the low-resolution three-dimensional image a set of particular voxels.

One then applies a second analytical algorithm of three-dimensional image reconstruction from acquired two-dimensional images and considering only the voxels of the reconstruction support. The first and second analytical algorithms can be identical or different. Preferably, the main characteristic of the first algorithm is speed, the quality of the image obtained being less important.

That method has the advantage of applying an analytical algorithm twice with a calculation time for each application in the order of eight times less than the standard application of an analytical algorithm directly on a high-resolution (HR) acquired two-dimensional image. The first application of the analytical algorithm is faster than a standard application, for the two-dimensional image from which the algorithm is made possesses a reduced resolution. The second application of the analytical algorithm is more rapid than a standard application, for the number of voxels used to reconstruct the high-resolution three-dimensional image is considerably limited.

According to one embodiment of the invention, the subsampling of an acquired two-dimensional image includes obtaining a low-resolution acquired two-dimensional image in which each pixel is composed of several pixels of the initial acquired two-dimensional image with the average gray level of the initial pixels as gray level.

According to one advantageous characteristic of the invention, the first and second analytical algorithms are so-called Feldkamp algorithms. That type of algorithm, well known to the expert, is described in the article "Practical cone-beam algorithm," L. A. FELDKAMP, L. C. DAVIS and J. W. KRESS, Journal Optical Society of America, A/Vol. 1, No. 6, June 1984. In general, Feldkamp's analytical algorithm mainly comprises a filtering stage and a back projection stage.

The reconstruction support is advantageously determined by applying a threshold on the low-resolution three-dimensional image, so as to maintain a percentage of voxels having the greatest gray levels.

The invention also proposes a method of three-dimensional image reconstruction from a set of acquired two-dimensional images in which:

filtering of the set of acquired two-dimensional images is carried out so as to obtain filtered two-dimensional images, subsampling of the set of filtered two-dimensional images is carried out so as to reduce the resolution of the filtered two-dimensional images, a back projection of the subsampled two-dimensional images of low resolution, therefore, is carried out in order to obtain a low-resolution three-dimensional image, a reconstruction support is determined by selecting in the low-resolution three-dimensional image a set of particular voxels, and a back projection of the filtered two-dimensional images is carried out by considering only the voxels of the reconstruction support.

The filtering and back project ion stages are preferably carried out by applying Feldkamp's algorithm. In other words, Feldkamp's algorithm is applied the first time by inserting a subsampling stage between filtering and back projection. Then Feldkamp's algorithm is applied a second time by carrying out only the back projection stage. The filtering stage is carried out only in the second application of Feldkamp's algorithm, for the latter is applied on already filtered images. A time saving is thus obtained by economizing on a filtering stage.

BRIEF DESCRIPTION OF THE DRAWINGS

Other advantages and characteristics of the invention will appear on examination of the detailed description of a nonlimitative embodiment and of the attached drawings, on which:

FIG. 4 is a flow chart of an embodiment of the method according to the invention.

DETAILED DESCRIPTION OF THE INVENTION

Figure 1:
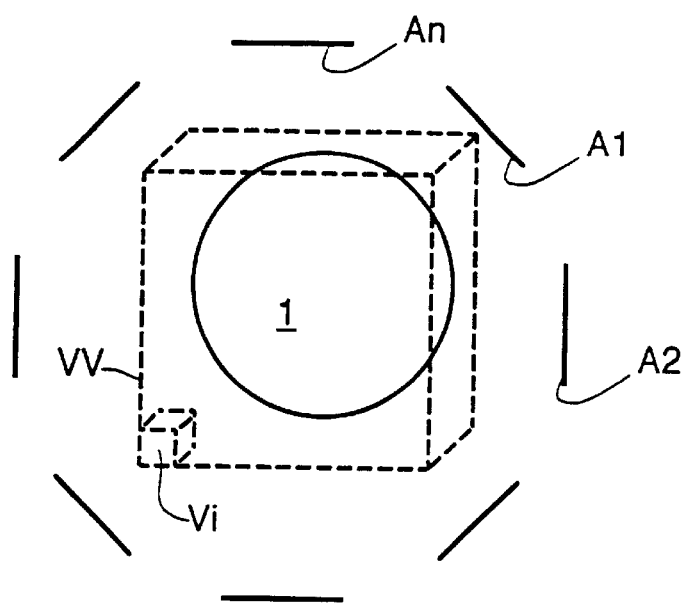
FIG. 1 schematically illustrates a set of two-dimensional projected images around an object.
Figure 2:
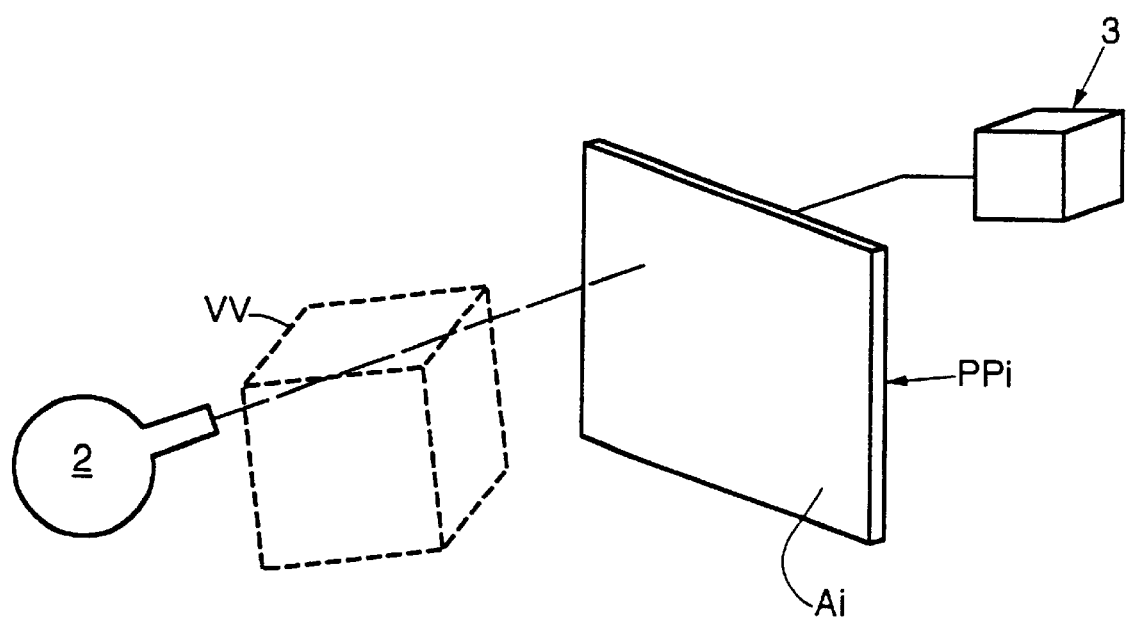
FIG. 2 illustrates in more detail the acquisition of one of those two-dimensional projected images.

Referring, in particular, to FIGS. 1 and 2, it can be seen that the imaging system usable for applying the invention makes it possible to obtain a set of two-dimensional acquired images A1–An obtained in this case by 180° rotation around a patient's head 1, for example, by an X-ray source 2. In fact, as is standard in angiography, each acquired image Ai is a subtracted image which is, for example, obtained by a standard technique of logarithmic subtraction of two X-rays taken at the same angle of incidence before and after an injection of a contrast medium into the vasculature, the three-dimensional image of which it is desired to reconstruct.

A virtual volume VV which can contain the patient's head 1 is subdivided into voxels Vi.

Each acquired image Ai is obtained from a two-dimensional radiation detector, for example, of the luminance amplifier type used in radiology, placed opposite the X-ray tube in a so-called projection plane PPi. The different projection planes are obtained by the different angular positions of the detector rotating around the patient's head. The detector is connected to processing means 3 containing, notably, sampling means connected to a microprocessor incorporating as software in its associated program memory the analytical algorithm of image reconstruction used in the invention and, in general, all the functional means making possible the use of the method according to the invention.

Figure 3:
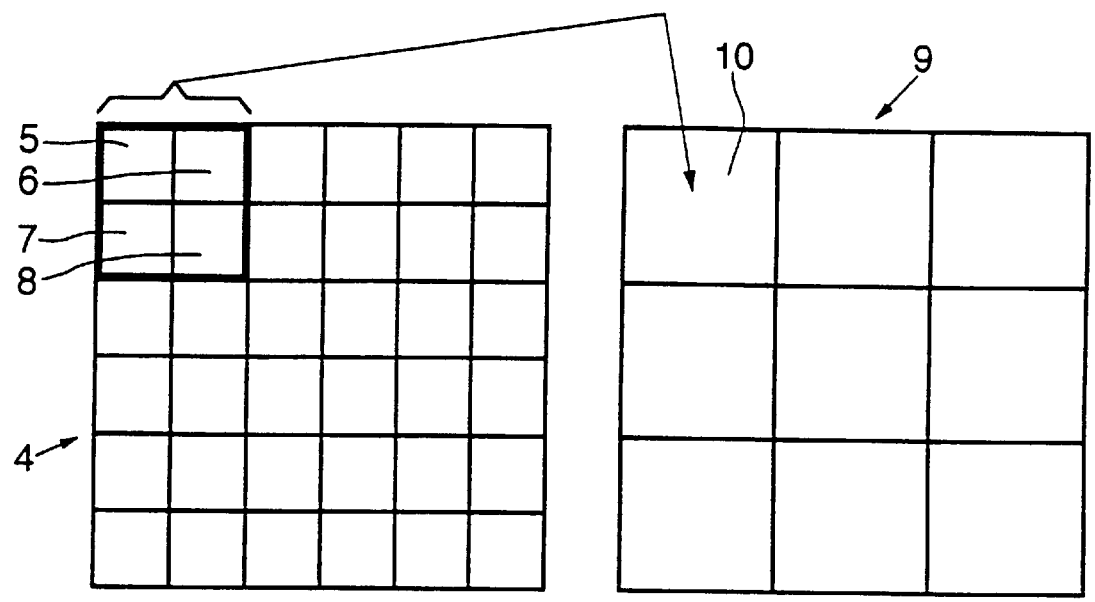
FIG. 3 illustrates an averaging operation, also called subsampling, in order to reduce the resolution of an acquired two-dimensional image according to the invention.

FIG. 3 illustrates two networks of cells. Each network represents, very schematically, a two-dimensional image in which each cell is a pixel. Image 4 is a two-dimensional image acquired with a high resolution. The high resolution is, for example, the resolution desired by the user, that is, 512 line pixels and 512 column pixels. Image 9 is a two-dimensional image obtained after averaging of the acquired two-dimensional image so as to reduce the resolution. Image 9 is endowed with a low resolution, a pixel of image 9 typically being formed from four pixels of image 4, that is, 256 line pixels and 256 column pixels. Pixel 10, for example, possesses a gray level equal to the average gray level of pixels 5, 6, 7 and 8. The analytical algorithm will be applied a first time on the low-resolution image 9, this having the advantage of a considerable time saving over a high-resolution reconstruction. It is estimated, for example, that a reconstruction with a two-dimensional image resolution of $256^2$ pixels is approximately eight times more rapid than a reconstruction with a two-dimensional image resolution of $512^2$.

The method of an embodiment of the invention therefore employs a set of acquired two-dimensional images for the reconstruction of a vascular system, for example. In order to obtain a three-dimensional image according to the invention, it is necessary to subsample, in other words, to take an average of the acquired two-dimensional images according to the illustration of FIG. 3. The different stages of the method according to the invention are illustrated on FIG. 4, in which the high-resolution acquired two-dimensional images 11 are distinguished as initial element. These are images originating from the system of acquisition with a resolution desired by the user, that is, $512^2$, or 512 line pixels and 512 column pixels. Those acquired two-dimensional images 11 contain the vasculature having to be reconstructed. In stage 12 an averaging or subsampling operation is carried out, in accordance with the illustration of FIG. 3, on each two-dimensional image 11 in order to obtain a two-dimensional image 13 of low resolution, that is, $256^2$.

Feldkamp's analytical algorithm is applied a first time to stage 14 from the low-resolution two-dimensional images 13 and from a virtual volume 15, such as a cube containing $256^3$ voxels. The virtual volume 15 can also be a sphere.

Feldkamp's analytical algorithm is applied in standard manner, namely, a first stage of filtering of the low-resolution two-dimensional images 13 followed by a back projection stage. The back projection stage consists of taking each voxel of the cube 15, projecting it on the low-resolution two-dimensional images 13 and assigning to that voxel a gray level identical to the sum of the gray levels of the pixels on which the voxel is projected. The image 16 obtained is a low-resolution three-dimensional image containing $256^3$ voxels. The algorithmic treatment of stage 14 is rapid compared to the same algorithmic treatment directly introducing the acquired two-dimensional images 11, for the number of voxels to be considered is far less, $256^3$ instead of $512^3$.

A selection 17 is then made of useful voxels, that is, voxels obeying a predetermined criterion. The predetermined criterion is established so as to retain only voxels representing the vasculature. That predetermined criterion is, for example, the safeguard of 5% voxels having the greatest gray levels. However, only the coordinates of those 5% voxels are indispensable, and their gray levels are not retained. The voxels included in the 5% constitute the reconstruction support 18. The object of that first three-dimensional reconstruction is therefore the location of a pertinent region (the vasculature), characterized by a group of particular voxels constituting the reconstruction support. The reconstruction support 18 is considered low resolution, for it originates from a cube of $256^3$ voxels. The reconstruction support 18 can be considered identical to the cube 15 in which certain voxels are taken into account, that is, a hollow cube.

The selection of the reconstruction support 18 can be made in another manner, such as a segmentation.

In stage 19 a matching is made by dividing each voxel of the reconstruction support 18 so as to obtain a high-resolution support 20 inscribed in a cube of $512^3$ voxels. That matching operation is a simple operation of transformation of coordinates which enables the reconstruction support 18 to conform to the application of the subsequent stage 21 carried out with a resolution of $512^3$.

Feldkamp's analytical algorithm is then applied a second time to stage 21 from high-resolution acquired two-dimensional images 11 and from the high-resolution support 20. For that second application of Feldkamp's algorithm, the three-dimensional image resolution to be obtained is $512^3$. A filtering of the acquired two-dimensional images 11 is then carried out in standard manner and a back projection is undertaken solely of the voxels of the high-resolution support 20. In practice, each voxel of a cube of $512^3$ voxels is considered. If the coordinates of the voxel correspond to a voxel outside the support 20, the back projection is not performed. On the other hand, if the coordinates of the voxel correspond to a voxel in the support 20, the back projection is performed and a gray level is assigned to the voxel identical to the sum of the gray levels of the pixels of the acquired two-dimensional images 11 on which the voxel is projected.

Thus, by carrying out back projection only with a limited number of voxels, the time of calculation of the high-resolution three-dimensional image 22 is considerably reduced. Only the voxels characterizing the vasculature are taken into account. No three-dimensional reconstruction is made of the unnecessary regions not involved in the vasculature.

Although the invention has been described with a first application of the analytical algorithm on low-resolution images of $256^2$, it is also possible to apply an analytical algorithm a first time on low-resolution two-dimensional images of $64^2$, so as to determine a first support, and to apply an analytical algorithm a second time on low-resolution two-dimensional images of $256^2$ by using the first support to determine a second support, and then to apply an algebraic algorithm one last time on the high-resolution two-dimensional images of $512^2$ by using the second support to reconstruct the final three-dimensional image. It is easy to understand that starting with too low a resolution of two-dimensional images multiplies the number of stages to be carried out and, therefore, the calculation time.

Various modifications in structure and/or steps and/or function may be made by one skilled in the art without departing from the scope of the invention.

What is claimed is:

1. A method of three-dimensional image reconstruction from a set of acquired two-dimensional images comprising:

a subsampling of the set of acquired two-dimensional images is carried out so as to reduce the resolution of the acquired two-dimensional images;

a first analytical algorithm of three-dimensional image reconstruction from acquired two-dimensional images of low resolution is applied in order to obtain a low-resolution three-dimensional image;

a reconstruction support is determined by selecting in the low-resolution three-dimensional image a set of particular voxels; and a second analytical algorithm of three-dimensional image reconstruction from acquired two-dimensional images is applied, by considering only the voxels of the reconstruction support;

wherein the subsampling of an acquired two-dimensional image includes obtaining a low-resolution acquired two-dimensional image in which each pixel is composed of several pixels of the initial acquired two-dimensional image with the average gray level of the initial pixels being a gray level.

2. The method according to claim 1 wherein the first and second analytical algorithms are Feldkamp algorithms.

3. The method according to claim 1 wherein the first and second analytical algorithms are Feldkamp algorithms.

4. Method according to claim 1 wherein the reconstruction support is determined by applying a threshold on the low-resolution three-dimensional image, so as to maintain a percentage of voxels having the greatest gray levels.

5. Method according to claim 1 wherein the reconstruction support is determined by applying a threshold on the low-resolution three-dimensional image, so as to maintain a percentage of voxels having the greatest gray levels.

6. Method according to claim 2 wherein the reconstruction support is determined by applying a threshold on the low-resolution three-dimensional image, so as to maintain a percentage of voxels having the greatest gray levels.

7. Method according to claim 3 wherein the reconstruction support is determined by applying a threshold on the low-resolution three-dimensional image, so as to maintain a percentage of voxels having the greatest gray levels.

8. A method of three-dimensional image reconstruction from a set of acquired two-dimensional images, comprising:

filtering of the set of acquired two-dimensional images is carried out so as to obtain filtered two-dimensional images;

subsampling of the set of filtered two-dimensional images is carried out so as to reduce the resolution of the filtered two-dimensional images;

a back projection of the subsampled two-dimensional images of low resolution is carried out in order to obtain a low-resolution three-dimensional image;

a reconstruction support is determined by selecting in the low-resolution three-dimensional image a set of particular voxels; and a back projection of the filtered two-dimensional images is carried out by considering only the voxels of the reconstruction support;

wherein the subsampling of the set of filtered two-dimensional images includes obtaining a low-resolution acquired two-dimensional image in which each pixel is composed of several pixels of the initial acquired two-dimensional image with the average gray level of the initial pixels being a gray level.

9. The method according to claim 8, wherein the filtering and back projection stages are carried out by applying a Feldkamp algorithm.

* * * * *